US012734903B2

(12) United States Patent
Jeoung et al.

(10) Patent No.: US 12,734,903 B2

(45) Date of Patent: Sep. 15, 2026

(54) ELECTRIFIED VEHICLE AND METHOD OF DOWNHILL DRIVING CONTROL THEREFOR

(71) Applicants: Hyundai Motor Company, Seoul (KR); Kia Corporation, Seoul (KR)

(72) Inventors: Dong Won Jeoung, Suwon-Si (KR); Sang Mo Ha, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 253 days.

(21) Appl. No.: 18/389,136

(22) Filed: Nov. 13, 2023

(65) Prior Publication Data

US 2024/0424913 A1 Dec. 26, 2024

(30) Foreign Application Priority Data

Jun. 22, 2023 (KR) ........................ 10-2023-0080528

(51) Int. Cl.

| | |
|---|---|
| ***B60L 15/20*** | (2006.01) |
| ***B60L 7/26*** | (2006.01) |
| ***B60T 8/24*** | (2006.01) |
| ***B60W 30/14*** | (2006.01) |

(52) U.S. Cl.

CPC ............. *B60L 15/2018* (2013.01); *B60L 7/26* (2013.01); *B60T 8/245* (2013.01); *B60W 30/143* (2013.01); *B60L 2240/12* (2013.01); *B60L 2240/423* (2013.01); *B60L 2240/642* (2013.01)

(58) Field of Classification Search

CPC ........ B60T 7/12; B60T 8/245; B60T 2201/04; B60W 30/143; B60W 30/146; B60W 2552/15; B60L 15/2018; B60L 15/2027

See application file for complete search history.

(56) References Cited

U.S. PATENT DOCUMENTS

| | | | | |
|---|---|---|---|---|
| 5,941,614 | A * | 8/1999 | Gallery | B60T 8/345 180/170 |
| 2005/0096183 | A1* | 5/2005 | Watanabe | B60T 7/12 477/182 |
| 2006/0241844 | A1* | 10/2006 | Mori | B60W 40/105 701/93 |
| 2007/0090691 | A1* | 4/2007 | Maskell | B60T 8/00 303/192 |
| 2008/0108477 | A1* | 5/2008 | Noll | B60K 31/04 477/23 |
| 2009/0227418 | A1* | 9/2009 | Farnsworth | B60L 15/2018 477/7 |

(Continued)

FOREIGN PATENT DOCUMENTS

| | | | | |
|---|---|---|---|---|
| CN | 109895775 A | | 6/2019 | |
| CN | 111376728 A | * | 7/2020 | B60L 7/10 |

(Continued)

*Primary Examiner* — David A Testardi

(74) *Attorney, Agent, or Firm* — MORGAN, LEWIS & BOCKIUS LLP

(57) ABSTRACT

An electrified vehicle with a brake position sensor and a controller and a downhill driving control method for the electrified vehicle include the controller which is configured to determine whether a virtual brake-based control condition is satisfied and outputs a braking command based on a virtual brake signal generated based on a first threshold value when the virtual brake-based control condition is satisfied.

15 Claims, 4 Drawing Sheets

(56) References Cited

U.S. PATENT DOCUMENTS

2009/0287388 A1* 11/2009 Bach ........................ B60T 8/245 701/76
2010/0036564 A1* 2/2010 Blaise .................. B60W 10/06 701/45
2010/0217469 A1* 8/2010 Bach ........................ B60T 7/122 701/31.4
2010/0292902 A1* 11/2010 Bach ........................ B60T 7/122 477/189
2012/0209479 A1* 8/2012 Yanagida ................ B60T 7/122 701/70
2013/0066493 A1* 3/2013 Martin .................. B60W 10/06 180/65.265
2013/0197773 A1* 8/2013 Shuler ................... B60T 13/585 701/93
2013/0261889 A1* 10/2013 Sekine ................ B60W 50/085 701/93
2014/0156163 A1* 6/2014 Shin .................... B60W 10/184 701/94
2015/0203117 A1* 7/2015 Kelly .................... B60W 40/06 701/91
2018/0134291 A1* 5/2018 Burford .............. B60W 30/143
2018/0170347 A1* 6/2018 Kim ................ B60W 30/18127
2018/0244247 A1* 8/2018 Carlsson ............... B60T 8/1708
2018/0244269 A1* 8/2018 Carlsson ........... B60W 30/1884
2018/0251103 A1* 9/2018 Satterthwaite ........ F16D 66/022
2019/0176827 A1* 6/2019 Han ................ B60W 30/18072
2020/0171956 A1* 6/2020 Park ........................ B60T 8/245
2021/0053552 A1* 2/2021 Szczepaniak ......... B60W 10/18
2021/0070263 A1* 3/2021 Kono .................... B60T 8/1766
2021/0155214 A1* 5/2021 Quaiyum ............ B60W 30/143
2021/0172515 A1* 6/2021 Jeon ........................ F16H 59/44
2021/0380094 A1* 12/2021 Choi ..................... B60W 10/08
2022/0089023 A1* 3/2022 Aoyama ............. B60W 30/146
2022/0089024 A1* 3/2022 Aoyama ................ B60K 35/29
2022/0258614 A1* 8/2022 Matsuki .................... B60L 7/18
2022/0333681 A1* 10/2022 Chai ....................... F16H 59/44
2023/0018720 A1* 1/2023 Kim .................... B60W 30/143
2024/0109426 A1* 4/2024 Szilassy .................... B60L 7/26

FOREIGN PATENT DOCUMENTS

JP 2010023565 A * 2/2010
JP 2017145713 A * 8/2017
JP 2017218100 A * 12/2017
JP 2019004573 A * 1/2019
JP 2022156179 A * 10/2022
KR 20050054619 A * 6/2005
KR 101774688 B1 * 9/2017 .......... B60W 40/105
KR 10-2019-0068285 6/2019

* cited by examiner

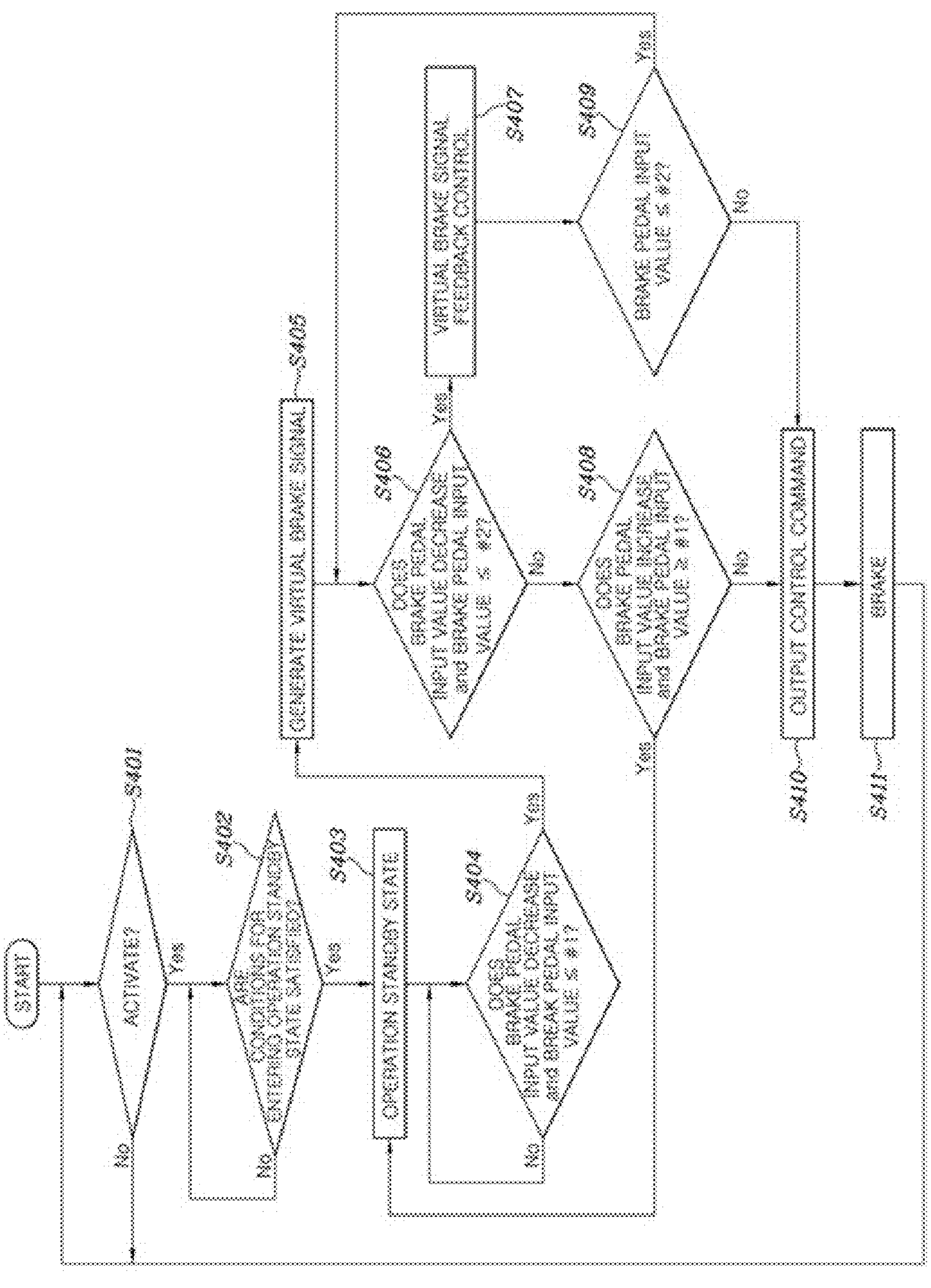
FIG. 4
START
ACTIVATE?
S401
Yes
No
ARE CONDITIONS FOR ENTERING OPERATION STANDBY STATE SATISFIED?
S402
Yes
No
OPERATION STANDBY STATE
S403
DOES BRAKE PEDAL INPUT VALUE DECREASE and BREAK PEDAL INPUT VALUE ≥ #1?
S404
Yes
No
GENERATE VIRTUAL BRAKE SIGNAL
S405
DOES BRAKE PEDAL INPUT VALUE DECREASE and BRAKE PEDAL INPUT VALUE ≤ #2?
S406
Yes
No
VIRTUAL BRAKE SIGNAL FEEDBACK CONTROL
S407
DOES BRAKE PEDAL INPUT VALUE INCREASE and BRAKE PEDAL INPUT VALUE ≥ #1?
S408
Yes
No
BRAKE PEDAL INPUT VALUE ≤ #2?
S409
Yes
No
OUTPUT CONTROL COMMAND
S410
BRAKE
S411

ELECTRIFIED VEHICLE AND METHOD OF DOWNHILL DRIVING CONTROL THEREFOR

CROSS REFERENCE TO RELATED APPLICATION

The present application claims priority to Korean Patent Application No. 10-2023-0080528, filed Jun. 22, 2023, the entire contents of which is incorporated herein for all purposes by this reference.

BACKGROUND OF THE PRESENT DISCLOSURE

Field of the Present Disclosure

The present disclosure relates to an electrified vehicle with improved driving convenience and driving control performance in a downhill driving situation and a downhill driving control method for the electrified vehicle.

Description of Related Art

In general, when a vehicle is driving downhill, that is, during downhill driving, gravity acts in the driving direction of the vehicle by the gradient. Therefore, compared to even road driving, additional braking is required to drive the vehicle within a certain speed range.

Various methods may be employed for braking, such as manipulating a brake pedal or adjusting braking force through a control system by a driver. Notably, the braking force may be adjusted using functions such as a smart cruise control (SCC) function and a downhill brake control (DBC) function through a control system.

The SCC function allows a vehicle to drive while maintaining the speed within a predetermined range without manipulation by a driver, but in general, the SCC function does not activate driving control while the brake pedal is pressed or is terminated by the manipulation of the brake pedal. Therefore, the SCC function may not be suitable for downhill driving situations.

The DBC function allows a vehicle to drive while maintaining the speed within a predetermined range without manipulation by a driver in a downhill driving situation, but the speed control is limited and the desired speed set by the driver may not be fully satisfied. Furthermore, there is a possibility of generating noise during the control process, which impairs the drivability of the vehicle.

Therefore, there is a demand for a control method which may improve driving convenience and driving control performance for downhill driving situations.

The information included in this Background of the present disclosure is only for enhancement of understanding of the general background of the present disclosure and may not be taken as an acknowledgement or any form of suggestion that this information forms the related art already known to a person skilled in the art.

BRIEF SUMMARY

Various aspects of the present disclosure are directed to providing an electrified vehicle, of which driving convenience and driving control performance are improved by controlling driving through a virtual brake signal in a downhill driving situation, and a downhill driving control method for the electrified vehicle.

The object of the present disclosure is not limited to the object described above, and other objects not mentioned will be clearly understood by those skilled in the art from the following description.

According to an exemplary embodiment of the present disclosure for achieving the object described above, an electrified vehicle includes a brake position sensor and a controller which is configured for determining whether a preset virtual brake-based control condition is satisfied during downhill driving based on an inclination in the driving direction, a relationship between a brake pedal input value inputted through the brake position sensor and a first threshold value determined based on the inclination, and an increasing or decreasing state of the brake pedal input value and outputs a braking command based on a generated virtual brake signal when the virtual brake signal-based control condition is satisfied.

For example, the braking force determined according to the braking command may be determined based on the value of the virtual brake signal regardless of the brake pedal input value.

For example, the virtual brake-based control condition may be satisfied when the inclination is equal to or greater than a preset value and the brake pedal input value is equal to or less than the first threshold value and decreasing.

For example, the virtual brake-based control condition may be satisfied when the inclination is equal to or greater than a preset value and the brake pedal input value decreases from above the first threshold value to the first threshold value or less than the first threshold value.

For example, the first threshold value may be determined to correspond to a gradient load according to the inclination.

For example, the virtual brake signal may be generated by further considering a correction value preset to correspond to the inclination as well as the first threshold value.

For example, when the brake pedal input value decreases to a second threshold value, which is less than the first threshold value, or less while the braking command is outputted, the controller may perform feedback control of the virtual brake signal based on the second threshold value while the braking command is outputted.

For example, when the brake pedal input value is the second threshold value, the feedback control of the virtual brake signal may be performed based on an error between a target vehicle speed corresponding to the speed and a vehicle speed according to the braking command.

For example, feedback control of the virtual brake signal may be performed so that the correction amount of the virtual brake signal increases as the error between vehicle speed according to the braking command and the target vehicle speed increases.

For example, feedback control of the virtual brake signal may be performed by further considering the accumulation of errors.

For example, the target vehicle speed may vary according to a user input value.

For example, the feedback control of the virtual brake signal may be terminated when the brake pedal input value exceeds the second threshold value.

For example, the controller may output the braking command based on the brake pedal input value in at least one of the following cases: when the brake pedal input value exceeds the first threshold value, when the brake pedal input value is increasing, and when acceleration in excess of a predetermined level is requested.

For example, when the brake pedal input value increases to exceed the first threshold value, the controller may output the braking command based on the brake pedal input value.

For example, a motor performing regenerative braking may be further included, and the controller may be configured for controlling the motor to perform regenerative braking based on the outputted braking command.

For example, a hydraulic brake performing hydraulic braking may be further included, and the controller may be configured for controlling the motor and the hydraulic brake so that the required braking force according to the braking command is satisfied through the regenerative braking and the hydraulic braking through the hydraulic brake.

For example, the controller may enter an operation standby state during downhill driving when the inclination is equal to or greater than the preset value and the brake pedal input value exceeds a preset third threshold value and may output the braking command based on the virtual brake signal when the brake pedal input value is equal to or less than the first threshold value and decreasing in the operation standby state.

For example, when an activation request for the virtual brake signal-based control is not inputted or a failure signal is inputted, the controller may not enter the operation standby state.

For example, an interface device displaying a control state of the controller may be further included.

A downhill driving control method of an electrified vehicle according to an exemplary embodiment of the present disclosure for achieving the object described above includes determining a preset virtual brake-based control condition during downhill driving based on an inclination in the driving direction, a relationship between a brake pedal input value measured through a brake position sensor and a first threshold value determined based on the inclination, and an increasing or decreasing state of the brake pedal input value and generating a virtual brake signal based on the first threshold value when the virtual brake-based control condition is satisfied, and outputting the braking command based on the virtual brake signal.

According to various embodiments of the present disclosure as described above, the driver's driving intervention through the accelerator, brake pedal, gearshifting lever, paddle shift, and the like may be minimized so that driving convenience in a downhill driving situation may be improved.

Furthermore, driving control may be performed according to the desired driving speed of the driver even in a downhill driving situation so that the performance of driving control may be improved.

Furthermore, there is no need to add a separate component to implement driving control so that the present disclosure may be readily applied to conventional vehicles.

Furthermore, application to vehicles including regenerative braking capability may improve the precision and energy efficiency of driving speed control.

The methods and apparatuses of the present disclosure have other features and advantages which will be apparent from or are set forth in more detail in the accompanying drawings, which are incorporated herein, and the following Detailed Description, which together serve to explain predetermined principles of the present disclosure.

BRIEF DESCRIPTION OF THE DRAWINGS

FIG. 4 is a flowchart for describing a downhill driving control process according to an exemplary embodiment of the present disclosure.

Figure 1:
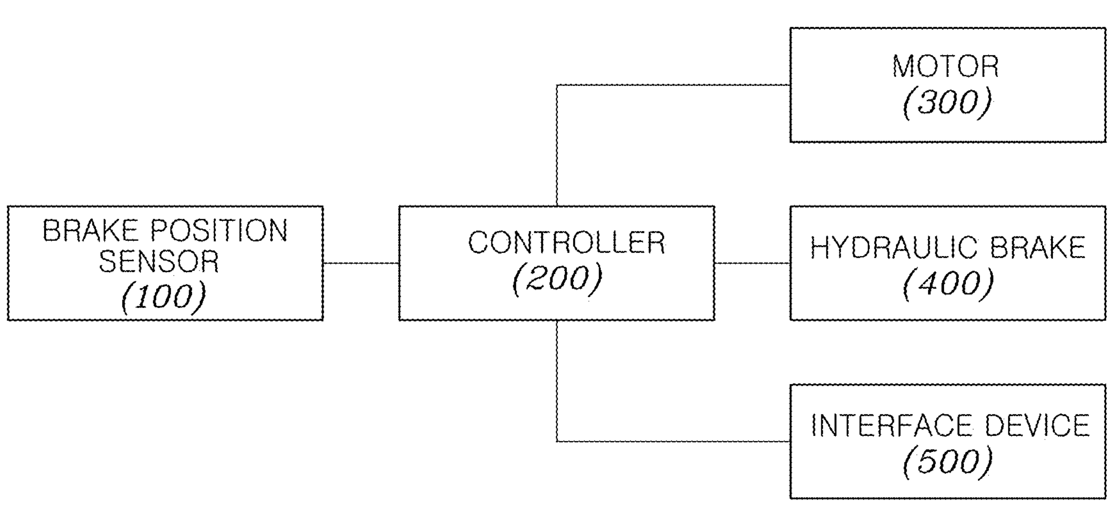
FIG. 1 is a view exemplarily illustrating a configuration of an electrified vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of the exemplary embodiments of the present disclosure included herein or the application are presented only for describing embodiments of the present disclosure, and the present disclosure may be implemented as various embodiments which should not be construed as limited to the exemplary embodiments described herein or in the application.

Because the exemplary embodiments of the present disclosure may be subjected to various modifications and may assume many forms, specific embodiments will be illustrated in the drawings and described in detail herein or in the application. However, this is not intended to limit embodiments according to the concept of the present disclosures to particular disclosure forms and should be understood to include all modifications, equivalents, and substitutes included in the scope of ideas and technology of the present disclosure.

Unless defined otherwise, all terms used herein, including technical or scientific terms, include the same meaning as commonly understood by those with ordinary skill in the art to which the present disclosure pertains. Terms such as those defined in commonly used dictionaries should be construed as including a meaning consistent with the meaning in the context of the related art and are not to be construed in an ideal or overly formal meaning unless explicitly defined herein.

The exemplary embodiments included herein will be described in detail with reference to the accompanying drawings. However, the same or similar components will be provided the same reference numerals regardless of the drawing numbers, and the repetitive descriptions regarding these components will be omitted.

In the following description of embodiments, the term "preset" means that the value of a parameter is predetermined when the parameter is used in a process or algorithm. The value of the parameter may be set at the start of the process or algorithm or may be set while the process or algorithm is performed, depending on the embodiments.

The suffixes "module" and "unit" for the components used in the following description are provided or interchangeably used only to facilitate the writing of the specification, without necessarily indicating a distinct meaning or role of their own.

When it is determined that the specific description of the related and already known technology may obscure the essence of the exemplary embodiments included herein, the specific description will be omitted. Furthermore, it is to be understood that the accompanying drawings are only intended to facilitate understanding of the exemplary embodiments included herein and are not intended to limit the technical ideas included herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

Furthermore, a unit or a control unit included in the names such as a motor control unit (MCU), a hybrid control unit (HCU), and the like is a term widely used in the naming of controllers that control specific functions of a vehicle and does not mean a generic function unit.

A controller may include a communication device that communicates with other controllers or sensors to control the function configured for which the controller is responsible, a memory that stores an operating system or logic instructions and input and output information, and one or more processors that perform determinations, calculations, decisions, and the like necessary for controlling the functions for which the controller is responsible.

An electrified vehicle and a downhill driving control method for the electrified vehicle according to various exemplary embodiments of the present disclosure propose to generate a virtual brake signal according to an input of a brake pedal, output a braking command based on the generated virtual brake signal, and as a result, satisfy a desired speed of a driver while reducing driver's manipulation intervention in a downhill driving situation. An electrified vehicle and a downhill driving control method for the electrified vehicle according to various exemplary embodiments of the present disclosure will be described with reference to the drawings below.

FIG. 1 is a view exemplarily illustrating a configuration of an electrified vehicle according to an exemplary embodiment of the present disclosure.

FIG. 1 shows that an electrified vehicle according to an exemplary embodiment of the present disclosure may include a brake position sensor 100, a controller 200, a motor 300, a hydraulic brake 400, and an interface device 500. FIG. 1 mainly illustrates components related to the description of an electrified vehicle according to an exemplary embodiment of the present disclosure, and an actual electrified vehicle may certainly include more or fewer components. Each component will be described in detail below.

First, the brake position sensor 100 may be connected to a brake pedal of the vehicle, and a brake pedal input value may be measured through the position of the brake pedal detected through the brake position sensor 100.

The controller 200 may be configured to determine whether a virtual brake-based control condition is satisfied during downhill driving, and the virtual brake-based control condition may be determined based on the inclination in a driving direction, a relationship between a brake pedal input value and a first threshold value, and an increasing or decreasing state of the brake pedal input value.

When the inclination in the driving direction is equal to or greater than a preset value and the brake pedal input value measured through the brake position sensor 100 is equal to or less than the first threshold value and is decreasing, the controller 200 may be configured to determine that the virtual brake condition is satisfied and output the braking command based on a virtual brake signal generated based on the first threshold value.

That is, to output the braking command based on a virtual brake signal, it may be required that 1) the vehicle be driving downhill, 2) the inclination in the driving direction be equal to or greater than a preset value, 3) the brake pedal input value be equal to or less than the first threshold value, and 4) the brake pedal input value be decreasing.

The controller 200 may be configured to determine the inclination in the driving direction, and to the present end, the electrified vehicle according to an exemplary embodiment of the present disclosure may be provided with a sensor configured for determining the inclination of the current driving road, such as a longitudinal acceleration sensor. When the longitudinal acceleration sensor is provided, the controller 200 may be configured to determine the inclination in the driving direction based on the measurement results of the longitudinal acceleration sensor.

Furthermore, the controller 200 may be configured to determine whether the vehicle is driving downhill based on a gear stage and the inclination angle of the driving road. For example, when D gear is engaged and the inclination angle of the driving road is 0 or less, the controller 200 may be configured to determine that the vehicle is driving downhill.

On the other hand, the first threshold value may be determined based on the inclination of the driving road, and may be determined to correspond to a gradient load according to the inclination. Here, the gradient load may mean a force in the downhill direction of the driving road due to the weight of the vehicle and the inclination of the driving road, and can increase as the load of the vehicle increases and the inclination of the driving road increases. For example, the first threshold value may correspond to the brake input value that generates a braking force equal to the gradient load. Accordingly, the first threshold value may increase as the inclination increases.

The controller 200 may be configured to generate a virtual brake signal based on the first threshold value as described above and output the braking command based on the generated virtual brake signal.

The braking force determined according to the braking command may be determined based on the value of the virtual brake signal regardless of the brake pedal input value. In the instant case, the brake pedal may be used as a means for manipulating the vehicle to enter a control based on the virtual brake signal.

Furthermore, the controller 200 may output a braking command during downhill driving based on a virtual brake signal when the inclination is equal to or greater than a preset value and the brake pedal input value decreases from above the first threshold value to the first threshold value or less than the first threshold value. That is, the controller 200 may output the braking command based on the virtual brake signal when the brake pedal input value decreases to the first threshold value or less after the brake pedal input value is inputted and may not output the braking command based on the virtual brake signal when the brake pedal input value is simply decreasing and is equal to or less than the first threshold value.

In the above case, the braking command may be outputted based on the virtual brake signal at the point when the brake pedal input value corresponds to the first threshold value. Because the virtual brake signal is generated based on the first threshold value, the braking command according to the brake pedal input value before and after the point when the brake pedal input value corresponds to the first threshold value and the braking command based on the virtual brake signal may be outputted at similar levels so that the sense of discrepancy caused by control intervention may be alleviated.

On the other hand, the controller 200 may be configured to generate a virtual brake signal by further considering a correction value preset to correspond to the inclination as well as the first threshold value. The virtual brake signal may include a value corresponding to the product of the first threshold value and the correction value, and the controller 200 may reflect the correction value in generating the virtual brake signal with reference to a lookup table in which the correction values for each inclination are stored.

On the other hand, when the brake pedal input value decreases to the second threshold value or less while the braking command is outputted based on the virtual brake signal, the controller 200 may perform feedback control of the virtual brake signal based on the second threshold value.

In the instant case, the second threshold value may be set to a value smaller than the first threshold value and may include a value close to 0 as a value for setting the target vehicle speed.

The controller 200 may perform feedback control of the virtual brake signal based on an error between the target vehicle speed and the vehicle speed according to the braking command. In the instant case, the target vehicle speed may be set to correspond to the vehicle speed when the brake pedal input value is the second threshold value.

When the brake pedal input value decrease to the second threshold value which is close to 0, the driver may be deemed to want to maintain the current vehicle speed, so that the target vehicle speed is set to the vehicle speed when the brake pedal input value is the second threshold value and feedback control of the virtual brake signal is performed so that the driver's intention may be reflected in the driving control. That is, in the instant case, the brake pedal is configured as an input means of the target vehicle speed.

Feedback control of the virtual brake signal may be performed so that the correction amount of the virtual brake signal increases as the error between the vehicle speed according to the braking command and the target vehicle speed increases. In the instant case, the accumulation of errors between the vehicle speed according to the braking command and the target vehicle speed may be further considered. That is, feedback control of the virtual brake signal may be performed through proportional-integral (PI) control.

The target vehicle speed may not only be set by a brake pedal input value but may vary according to the input value of a user such as a driver. For example, a driver may input a desired vehicle speed through a speed control button provided in a vehicle, and the target speed may change based on the user input value. In the instant case, the speed control button may be implemented as a speed control button for a smart cruise control function. As a result, the range of speed selections may be further expanded in driving control.

On the other hand, when the brake pedal input value exceeds the second threshold value, the controller 200 may terminate feedback control of the virtual brake signal. In the instant case, when the brake pedal input value decreases to the second threshold value or less again, the target vehicle speed may be reset according to the vehicle speed at the time.

Furthermore, the controller 200 may output the braking command based on the brake pedal input value when at least one of the following conditions is satisfied: the brake pedal input value exceeds the first threshold value, the brake pedal input value is increasing, and an acceleration request in excess of a predetermined value is inputted. That is, in the instant case, the braking command is outputted based on the brake pedal input value measured through the brake position sensor 100 instead of outputting the braking command based on the virtual brake signal so that the driving control of the vehicle returns to the driver.

Here, the controller 200 may be configured to determine whether an acceleration request in excess of a predetermined value is inputted based on the accelerator input value, and measurement results through an accelerator position sensor (APS) provided in the accelerator may be used in the process. Furthermore, for example, when the accelerator input value exceeds 0, the controller 200 may be configured to determine that an acceleration request in excess of the predetermined value is inputted.

When the brake pedal input value increases to exceed the first threshold value, the controller 200 may output the braking command based on the brake pedal input value instead of outputting the braking command based on the virtual brake signal.

In the instant case, the outputting of the braking command based on the virtual brake signal is maintained when the brake pedal input value is simply increasing, but when the brake input value exceeds the first threshold value, the driver's intention to control driving in person is deemed to be evident, so that the braking force may be adjusted according to the driver's brake pedal manipulation. As a result, impairment of drivability caused by repeated changes of control between the driver and the controller 200 may be prevented.

On the other hand, when the inclination is equal to or greater than the preset value and the brake pedal input value exceeds a preset third threshold value, the controller 200 may enter an operation standby state during downhill driving. In the instant case, when the brake pedal input value decreases to the first threshold value or less in the operation standby state, the controller 200 may output the braking command based on the virtual brake signal.

Furthermore, when an activation request for the virtual brake signal-based control is not inputted or a malfunctioning signal is inputted, the controller 200 may enter the operation standby state. That is, the controller 200 may enter the operation standby state only when the activation request for the virtual brake signal-based control is inputted and a malfunctioning signal is not inputted.

Here, the activation request may be inputted through an operation button provided in a vehicle, and a malfunctioning signal may correspond to a diagnostic result of on-board diagnostics (OBD).

On the other hand, the controller 200 may be configured for controlling the motor 300 and the hydraulic brake 400 so that regenerative braking or hydraulic braking is performed to satisfy a required braking force corresponding to the outputted braking command. In the instant case, the controller 200 may be configured to determine the regenerative braking force and hydraulic braking force by allocating the required braking force to the motor 300 and the hydraulic brake 400. The allocation may be performed based on an allocation ratio set for each required braking force, and the fuel economy or power economy may improve as the proportion of regenerative braking force increases.

The interface device 500 may display the control state of the controller 200. Furthermore, the interface device 500 may be used for a driver to input a user input value.

For example, the interface device 500 may include a control button for inputting an activation request for a virtual brake signal-based control, and a display indicating the activation of the virtual brake signal-based control may be outputted when the activation request is inputted through the control button.

Furthermore, when the controller 200 enters the operation standby state, the interface device 500 may output a display indicating the operation standby state and may output displays indicating whether the controller 200 is outputting the braking command based on a virtual brake signal now, whether feedback control of a virtual brake signal is being performed, to what the target vehicle speed is set, and the like.

The interface device 500 may include a display, audio, and the like, and may be implemented as a cluster, an audio, video, and navigation (AVN) device, and the like provided in a vehicle.

A downhill driving control process according to an exemplary embodiment of the present disclosure will be described with reference to the graph illustrated in FIG. 2.

Figure 2:
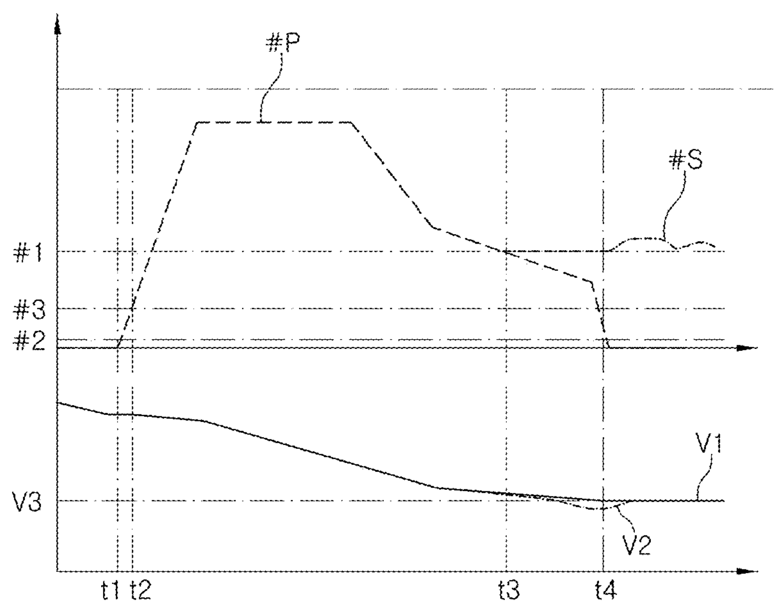
FIG. 2 is a view for describing downhill driving control according to an exemplary embodiment of the present disclosure.

FIG. 2 is a view for describing a downhill driving control according to an exemplary embodiment of the present disclosure.

Figure 3:
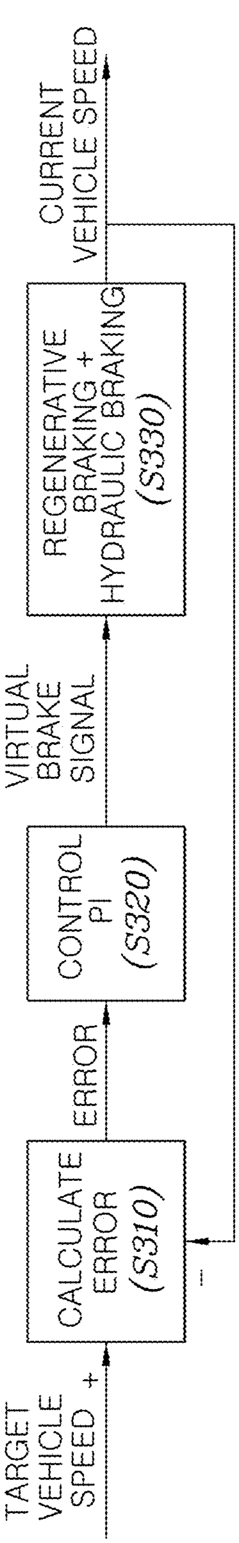
FIG. 3 is a view for describing feedback control of a virtual brake signal according to an exemplary embodiment of the present disclosure.

FIG. 2 illustrates a graph with signal values and vehicle speeds on the vertical axis and time on the horizontal axis. FIG. 3 shows signal changes and vehicle speed changes in a process of control based on the virtual brake signal after the vehicle enters a downhill road inclining in the driving direction equal to or greater than a preset value. For the convenience of description, the time axis will be divided into a first section (0~t1), a second section (t1~t2), a third section (t2~t3), a fourth section (t3~t4), and a fifth section (t4~).

First, in the first section (0~t1), the driver has not yet manipulated the brake pedal so that the brake pedal input value #P is 0. The zero brake pedal input value is interpreted as meaning that the driver has no intention of braking yet, and accordingly, the vehicle speed V1 may be maintained at a relatively high level compared to other sections.

Next, the second section (t1~t2) starts when the brake pedal input value #P occurs and ends when the third threshold value #3 is reached. The occurrence of the brake pedal input value #P may be interpreted as meaning that the driver intends to brake. Whether the brake pedal input value #P has reached the third threshold value #3 is configured as a criterion for the driver's braking intention, and in the instant case, the controller 200 may enter the operation standby state to perform driving control based on the virtual brake signal value #S when the brake pedal input value #P reaches the preset third threshold value #3.

The controller 200 may output the braking command based on the brake pedal input value #P without outputting the braking command based on the virtual brake signal value #S in the operation standby state, and additional conditions may be required to generate the virtual brake signal value #S or to output the braking command based thereon.

Furthermore, the vehicle speed in the second section (t1~t2) may be reduced relative to the first section (0~t1) due to the occurrence of the brake pedal input value #P.

On the other hand, the third threshold value #3 here is close to 0 and may be set to a value between the first threshold value #1 and the second threshold value #2, but is not limited thereto.

The brake pedal input value #P increases and then decreases to reach the first threshold value in the third section (t2~t3) and a subsection in which the brake pedal input value #P is maintained at a constant level may be included.

The increase of the brake pedal input value #P may be interpreted as meaning that the driver desires to increase the braking force, and the maintenance of the brake pedal input value #P may be interpreted as meaning that the driver is satisfied with the current level of braking force, while the decrease of the brake pedal input value #P may be interpreted as meaning that the driver desires to decrease the braking force, especially that the driver is satisfied with the current level of vehicle speed.

The brake pedal input value #P is greater in the third section (t2~t3) than in the second section (t1~t2), so that the vehicle speed may decrease relative to the second section (t1~t2).

The fourth section (t3~t4) starts when the brake pedal input value #P reaches the first threshold value #1 while decreasing and ends when the second threshold value #2 is reached, and the controller 200 may be configured to generate the virtual brake signal value #S corresponding to the first threshold value #1 when the brake pedal input value #P reaches the first threshold value #1 at t3.

The controller 200 may output the braking command based on the virtual brake signal value #S in the fourth section (t3~t4), and the brake pedal input value #P may not be reflected in the braking command.

The braking command is outputted based on the virtual brake signal value #S in the fourth section (t3~t4) so that the vehicle speed v1 may be maintained at a constant level regardless of the decrease in the brake pedal input value #p.

The fifth section (t4~) starts when the brake pedal input value #P reaches the second threshold value #2 while decreasing, and feedback control of the virtual brake signal value #S is performed in the fifth section (t4~). In the instant case, the target vehicle speed V3 for feedback control of the virtual brake signal value #S may be set to the vehicle speed V1 at the point when the brake input value #P reaches the second threshold value #2. Accordingly, the controller 200 may adjust the virtual brake signal value #S in the direction of reducing the error between the vehicle speed V1 and the target vehicle speed V3.

On the other hand, the braking command is outputted based on the virtual brake signal value #S in the fourth section (t3~t4) and the fifth section (t4~) so that braking may continue steadily even when the brake pedal input value #P gets close to 0 or reaches 0) and the braking force is maintained even if the driver releases the brake pedal, so driving convenience may be provided in a downhill driving situation.

Furthermore, when the braking command is outputted based on the brake pedal input value #P before the brake pedal input value #P reaches the second threshold value #2 and is outputted based on the virtual brake signal value #S after the brake pedal input value #P decreases to the second threshold value #2 or less, the vehicle speed V2 may relatively abruptly change due to the change in the braking command. In the instant case, the vehicle may jounce and drivability may be impaired, but by outputting the braking command based on the virtual brake signal value #S even before the brake pedal input value #P reaches the second threshold value #2, the vehicle speed V1 may not abruptly change in a process of stopping brake pedal manipulation, so drivability may be improved.

Feedback control of a virtual brake signal will be described with reference to FIG. 3 below.

FIG. 3 is a view for describing feedback control of a virtual brake signal according to an exemplary embodiment of the present disclosure.

FIG. 3 illustrates a control logic for the process of performing feedback control of a virtual brake signal in the controller 200.

First, the controller 200 may be configured to determine an error between the target vehicle speed and the current vehicle speed in the control process (S310). As described above, in the instant case, the target vehicle speed may be set to the vehicle speed at the point when the brake pedal input value reaches the second threshold value, and the current vehicle speed may be the speed according to the output of the braking command.

The controller 200 may perform PI control based on the determined error (S320). In the process, the correction amount of the virtual brake signal may be proportional to the error between the target vehicle speed and the current vehicle speed, and the accumulation of errors may be further considered.

Thereafter, the controller 200 may be configured for controlling the motor 300 and the hydraulic brake 400 so that regenerative braking and hydraulic braking are performed based on the virtual brake signal by which feedback control was performed.

The controller 200 again is configured to perform feedback control of the virtual brake signal based on the error between the current vehicle speed adjusted according to regenerative braking and hydraulic braking and the target vehicle speed.

The entire control process described thus far will be described with reference to a flowchart below.

FIG. 4 is a flowchart for describing a downhill driving control process according to an exemplary embodiment of the present disclosure.

FIG. 4 shows that the controller 200 first is configured to determine whether or not to activate the virtual brake signal-based control function (S401). For example, the controller 200 may be configured to determine whether or not to activate the control function based on whether the activation of the virtual brake signal-based control is requested and whether a failure signal is inputted. In the instant case, the interface device 500 may output a display indicating the activation of the virtual brake signal-based control function.

When the virtual brake signal-based control function is activated (Yes in S401), the controller 200 may be configured to determine whether the condition for entering the operation standby state is satisfied (S402). For example, the controller 200 may be configured to determine whether or not to enter the operation standby state based on the inclination of the driving road, inclination angle, brake pedal input value, and the like. In the instant case, the interface device 500 may output a display indicating that the operation standby state is entered.

The controller 200 may enter the operation standby state (S403) when the condition for entering the operation standby state is satisfied (Yes in S402) and generate the virtual brake signal (S405) when the brake pedal input value decrease to the first threshold value #1 or less in the operation standby state (Yes in S404). In the instant case, the virtual brake signal may be generated based on the first threshold value #1.

When the brake pedal input value decreases and does not fall to the second threshold value #2 or less (No in S406) and the brake pedal input value increases and does not exceed the first threshold value (No in S408) after the virtual brake signal is generated, the controller 200 may output the braking command based on the virtual brake signal (S410). The present operation of the controller 200 may be referred to as a first operation state, and in the instant case, the interface device 500 may output a display indicating that the first operation state is entered.

On the other hand, when the brake pedal input value increases to exceed the first threshold value (Yes in S408), the first operation state may be terminated to switch to the operation standby state and the interface device 500 may stop outputting a display indicating the first operation state is entered and output a display indicating that the operation standby state is reentered.

When the brake pedal input value decreases to the second threshold value #2 or less after the virtual brake signal is generated (Yes in S406), the braking command is not immediately outputted according to the generated virtual brake signal and feedback control of the virtual brake signal may be performed (S407). The controller 200 may perform feedback control of the virtual brake signal in a manner of reducing an error between the current vehicle speed and the target vehicle speed using the vehicle speed at the point when the brake pedal input value reached the second threshold value as the target vehicle speed.

When the brake pedal input value does not exceed the second threshold value (No in S409), the controller 200 may output the braking command according to the feedback-controlled virtual brake signal (S410), and the present operation of the controller 200 may be referred to as a second operation state. In the instant case, the interface device 500 may stop outputting a display indicating that the first operation state is entered, output a display indicating that the second operation state is entered, and output a display indicating the set target vehicle speed along therewith.

On the other hand, when the brake pedal input value increases to exceed the second threshold value (Yes in S409), the second operation state may be terminated and the interface device 500 may stop outputting a display indicating that the second operation state is entered without outputting a display indicating that the first operation state is reentered.

After the braking command according to the virtual brake signal is outputted, braking may be performed through the motor 300 and the hydraulic brake 400 to satisfy the required braking force based on the braking command (S411).

The driver's driving intervention through the accelerator, brake pedal, gearshifting lever, paddle shift, and the like may be minimized by the various embodiments of the present disclosure as described above so that driving convenience in a downhill driving situation may be improved.

Furthermore, driving control may be performed according to the desired driving speed of the driver and the like even in a downhill driving situation so that the performance of driving control may be improved.

Furthermore, there is no need to add separate components to implement driving control so that the present disclosure may be readily applied to conventional vehicles.

Furthermore, application to vehicles having regenerative braking capability may improve the precision and energy efficiency of driving speed control.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising a brake position sensor;

a motor configured to perform regenerative braking; and a controller configured to:

determine whether a preset virtual brake signal-based control condition is satisfied during downhill driving based on an inclination of a road in which the vehicle is driving in a driving direction, a brake pedal input value inputted through the brake position sensor, a first threshold value related to the brake pedal input value and determined based on the inclination, and a decreasing state of the brake pedal input value;

generate a virtual brake signal based on the first threshold value, based on the virtual brake signal-based control condition being satisfied;

output a braking command based on a value of the virtual brake signal; and control the motor to perform the regenerative braking based on the outputted braking command, wherein the controller is configured to correct the value of the virtual brake signal based on a second threshold value which is smaller than the first threshold value, based on the brake pedal input value being decreased to less than or equal to the second threshold value, while the braking command is outputted.

2. The vehicle of claim 1, wherein the virtual brake-based control condition is satisfied based on the inclination being equal to or greater than a preset value and the brake pedal input value is equal to or less than the first threshold value and decreasing.

3. The vehicle of claim 1, wherein the virtual brake-based control condition is satisfied based on the inclination being equal to or greater than a preset value and the brake pedal input value decreases from above the first threshold value to the first threshold value or less than the first threshold value.

4. The vehicle of claim 1, wherein the first threshold value is determined to correspond to a gradient load according to the inclination.

5. The vehicle of claim 1, wherein the controller generates the virtual brake signal by further considering a preset correction value corresponding to the inclination.

6. The vehicle of claim 1, wherein the controller is configured to correct the virtual brake signal based on an error between a target vehicle speed corresponding to a vehicle speed when the brake pedal input value is the second threshold value and a vehicle speed according to the braking command.

7. The vehicle of claim 6, wherein the controller is configured to correct the virtual brake signal so that a correction amount of the virtual brake signal increases as the error between the vehicle speed according to the braking command and the target vehicle speed increases.

8. The vehicle of claim 6, wherein the target vehicle speed varies according to a user input value.

9. The vehicle of claim 1, wherein a feedback control of the virtual brake signal is terminated based on the brake pedal input value exceeding the second threshold value.

10. The vehicle of claim 1, wherein the controller is configured to output the braking command based on the brake pedal input value in at least one of a first case that the brake pedal input value exceeds the first threshold value, a second case that the brake pedal input value is increasing, and a third case that acceleration pedal input value inputted by an acceleration position sensor of the vehicle is greater than a predetermined value.

11. The vehicle of claim 1, wherein the controller is configured to output the braking command based on the brake pedal input value in response that the brake pedal input value increases to exceed the first threshold value.

12. The vehicle of claim 1, further including a hydraulic brake performing hydraulic braking, wherein the controller is configured to control the motor and the hydraulic brake so that braking force required according to the braking command is satisfied through the regenerative braking and the hydraulic braking through the hydraulic brake.

13. The vehicle of claim 1, wherein the controller enters an operation standby state during downhill driving based on the inclination being equal to or greater than a preset value and the brake pedal input value exceeding a preset third threshold value and outputs the braking command based on the virtual brake signal based on the brake pedal input value being equal to or less than the first threshold value and decreasing in the operation standby state.

14. The vehicle of claim 1, further including an interface device outputting a control state of the controller.

15. A downhill driving control method of a vehicle, the method comprising:

determining, by a controller, whether a preset virtual brake signal-based control condition is satisfied during downhill driving based on an inclination of a road in which the vehicle is driving in a driving direction, a brake pedal input value measured through a brake position sensor, a first threshold value related to the brake pedal input value and determined based on the inclination, and a decreasing state of the brake pedal input value;

generating, by the controller, a virtual brake signal based on the first threshold value based on the virtual brake-based control condition being satisfied;

outputting, by the controller, a braking command based on a value of the virtual brake signal;

controlling, by the controller, a motor of the vehicle to perform the regenerative braking based on the outputted braking command; and correcting, by the controller, the value of the virtual brake signal based on a second threshold value which is smaller than the first threshold value, based on the brake pedal input value being decreased to less than or equal to the second threshold value, while the braking command is outputted.

* * * * *